United States Patent Office 3,257,217
Patented June 21, 1966

3,257,217
REFRACTORY
Merton L. Van Dreser, San Jose, and Berton G. Altmann, Los Gatos, Calif., assignors to Kaiser Aluminum & Chemical Corporation, Oakland, Calif., a corporation of Delaware
No Drawing. Filed Apr. 28, 1961, Ser. No. 106,180
16 Claims. (Cl. 106—58)

This invention relates to a bond for basic or nonacid refractory masses which are used as formed shapes, or which are placed in a furnace lining for example by ramming, gunning or other desired methods, and to refractory masses so prepared.

In the manufacture of furnace linings and the like, it is the usual practice to make formed refractory shapes for such purpose, or to ram into place, or cast in, refractory materials, including an aggregate of strong refractory grains and a binder which usually contains finely divided refractory material; and where a chemically bonded or cold bonded material is required, a temporary or chemical bond is used to provide initial strength in the cold and to enable the material to resist damage from handling or service loading until the formation of the ceramic or mineral bond under the heat of the furnace in operation is attained. For example, there may be employed as such chemical bond a Sorel cement composed essentially of magnesium chloride or magnesium sulfate solution and a reactive magnesia, or sodium silicate, or an organic binder such as tar or waste sulfite liquor or the like.

As the temperature is raised, the temporary chemical or cold magnesia bonds will be decomposed and will weaken as the refractory material passes through an intermediate temperature range, for example, from about 800° to about 1200° C. This zone of weakness occurs prior to the formation of the ultimate ceramic bond, and may in many instances lead to undesirable weakness in the lining structure during the heating up of the furnace in service. Usually a material which sinters to give a ceramic bond at such intermediate temperatures is not desirable, on the other hand, because in such event the thus-sintered materials would then become fluid at somewhat higher temperatures and the refractory would fail when placed under load where the temperature is increased.

Prior art compositions containing finely divided magnesia and sodium silicate bonding agents have exhibited tendencies to swelling and disruption of the body when being heated up in the presence of moisture, e.g., under conditions where a furnace or the refractory mixture for use in such structure passes slowly through or is held for a time at a temperature only slightly above room temperatures, for example, at around the boiling point of water or at higher temperatures within a refractory mass where moisture cannot escape. One composition, for instance, containing such magnesia and silicate has comprised a mixture of finely divided magnesia, fayalite (iron silicate), and the inclusion of sodium silicate as a cold bond. (This has been a very satisfactory and advantageous material because the fayalite reacts upon firing with the magnesia to form magnesium ferrite and magnesium silicate, both of which are excellent ceramic bonds and sustain loads well at the high temperatures of metallurgical furnaces in which such materials are utilized as lining materials.) The sodium silicate has provided a cold bond so that the refractory has had usable strength at lower temperatures, although not as high as presently desired. The above material has been useful both as a bond with basic refractory grains or nonacid refractory grains for making shaped masses and it has also been useful along with suitable aggregate in the production of a ramming mix and also has been useful as a mortar. However, the particular composition described has had the disadvantage that it will tend to lump or set under some storage conditions or conditions of shipment and use where moisture is available, due to setting up of the silicate. In addition, the above refractory mix after ramming, casting or shaping, has sometimes been deleteriously affected during heating up in a furnace, as explained above, and this is believed to be due to the hydration effect of moisture which may be tempering water of the mix itself or may be derived from adjacent refractories. This hydration during use is believed effected and accelerated by the pressures developed within the dense masses of refractory during the heating up period and due to the effect of the increasing temperatures on the moisture content which cannot readily escape.

The present invention overcomes the above disadvantages by providing a bonding material which consists essentially of finely divided magnesia, a small amount of a readily water-soluble hydrated alkali metal silicate, and a small amount of a water-soluble inorganic salt of boric acid. Preferably, there is used a small amount, up to 12% based on the total weight of the bonding material, of such alkali metal silicate, especially sodium silicate. Preferably, there is employed a small amount, up to 6.0% of an inorganic salt of boric acid, calculated as $B_2O_3$, and based on the total weight of the bonding material. It is to be understood that the present invention provides an improved bonding material containing finely divided magnesia, the alkali metal silicate and boric salt as defined; and the advantages will be obtained even though there is also added, if desired, another insoluble substance which will form a ceramic bond with magnesia upon firing, such as iron oxide, silica, alumina, aluminum silicate, fayalite or the like. The magnesia is added in an amount at least to react with any such reactive bond-formers at higher temperatures, and preferably to provide an excess of magnesia.

The magnesia which is useful in the present invention is any finely divided, deadburned magnesia. One suitable magnesia is that recovered from sea water by reaction of the sea water with calcined dolomite, washing and filtering the precipitate and firing to deadburn; or there can be used fired magnesia from any other source, e.g., deadburned magnesite. It is advantageous in most instances to include an excess of magnesia over that needed to react with the iron oxide, silica, fayalite, alumina, etc., as described above. When making a fayalite-containing batch, e.g., the magnesia is used in the bonding mixture in at least sufficient amount to react with all of the fayalite to form magnesioferrite with the iron oxide component thereof, and to form magnesium orthosilicate or forsterite with a silica component thereof.

The alkali metal silicate which is used in the present invention is a silicate of an alkali metal, such as sodium, lithium or potassium, and is of such composition that it dissolves readily in water. Preferably the ratio of alkali metal oxide to $SiO_2$ is from 1:1.5 to 1:3. The composition which has shown optimum results has been found to be $1Na_2O:2SiO_2$, and for most rapid solubility this composition is used in hydrate form. Sodium silicate of this composition and containing about 17–20% water of hydration gives excellent results and 75 grams of this compound dissolve in 100 grams of water within 5 minutes. There is preferably employed in refractory batches from 4.0% to 8.0% of such alkali metal silicate, especially hydrated sodium silicate of the above preferred composition, based on total weight of the bond mixture. When the bonding material is used per se as a mortar, it preferably contains from 2% to 4% such alkali metal silicate. The lower amounts of the silicate are preferred for highest refractoriness at the working temperatures of high temperature furnaces.

The inorganic salt of boric acid which is employed herein is preferably an alkali metal or alkaline earth metal salt of a boric acid such as metaboric, pyroboric, orthoboric, tetraboric or perboric acid, preferably the sodium salt of orthoboric acid or of tetraboric acid. An excellent material is anhydrous borax, $Na_2B_4O_7$, and this is especially advantageous in providing better storage life and good strengths in the presence composition. The hydrated forms of the borates are useful, but it is preferred to use the anhydrous borates. Mixtures of the borates with each other can be used in refractory batches in amounts to provide up to about 6.0% of boron calculated as $B_2O_3$, and preferably in amounts to provide from 2.0% up to 4.0% thereof, based on total weight of the bonding material. When used as a mortar per se, the bonding material preferably contains from 0.5 to 1.0% boron calculated as $B_2O_3$.

When making a fayalite-containing batch, the iron silicate used is preferably of high purity and there may be employed natural minerals which are rich in iron silicate provided they are low in fluxing components such as alumina, lime, $B_2O_3$, etc. A synthetic fayalite prepared by fusing together silica and iron oxide in the proper proportions is also suitable for use herein. The resulting sintered material is finely pulverized and is then ready for use. The chemical composition of the fayalite is not critical and the iron oxide analysis may vary from about 60 to 80% while the silica content varies from 40 to 20%, without greatly affecting the melting point; and compositions on either side of these ranges may also be satisfactorily employed although less beneficial results in lowering the temperature of formation of the ceramic bond may be then obtained. In order to obtain the best results, with the magnesia-fayalite bond, the iron silicate and the magnesia should be about 90% minus 100 mesh and materials which are finer than this provide excellent results. However, somewhat coarser particles, particularly in the fayalite, may be used where it is desirable to develop thermal plasticity at an intermediate stage in heating and higher refractoriness at a later stage in heating. Other substances which form ceramic bonds with magnesia can alternatively be incorporated in the present bonding compositions, in amounts whereby there will be present at least 10% excess magnesia. For example, in one suitable maintenance or patching mix for steel furnace hearths there is incorporated in the bonding composition of this invention from 15% to 25% mill scale.

In preparing the bonding agent of the present invention, the finely divided magnesia is mixed together with finely divided solid sodium silicate and finely divided borate. It is preferred that at least about 90% of each of the ingredients pass through a 100 mesh screen in order to obtain the best results, particularly when used with nonacid refractory aggregates to form shaped masses or lining materials such as ramming mixes. However, even greater subdivision of the materials is advantageous, and it has been found very useful to employ sodium tetraborate collector dust which is approximately 95% minus 400 mesh.

The bonding material according to the present invention consists essentially of finely divided deadburned magnesia and the soluble alkali metal silicate and soluble boron compound as described above. For production of ramming mixes, castables or shaped products the bonding material is preferably mixed with a refractory aggregate, or coarser grain material. Such an aggregate or grain material can be any nonacid, or basic grain material, such as periclase, deadburned magnesia or magnesite, spinel grains, chromite or admixtures of such materials, for instance, with each other. The dry admixture of bonding material, or of grain and bonding material can be stored or shipped and then mixed with tempering liquid, such as water, at the site of use. The bonding material is preferably used in a minor amount in the batch, for example, it comprises from 15% to less than 50% thereof. The grain material can be of any desired grain size, preferably in graded grain sizes to provide best packing and e.g., from grain size substantially entirely passing 4 mesh to that retained on 100 mesh. Advantageously, the particle sizes of aggregate which are well known in this art are employed herein. Preferably, with higher proportions of the bonding agent there are employed lower amounts of borate within the preferred range shown herein. The admixture of grain and bonding material is useful for lining metallurgical furnaces, e.g., for ramming in, patching or otherwise. In making gunning mixes, that is, batches which are to be placed in pneumatic guns for blowing by means of air onto the surface of a furnace lining, it is especially advantageous to employ as silicate constituent the highly soluble hydrated sodium silicate having a sodium oxide to silica ratio of 1:2. It is suitable to admix coarse particles of aggregate, an amount of intermediate sized particles, and the desired amount of bonding agent, suitable from 15 to 50% thereof, on the dry basis, to form a shaped mass or a ramming mix.

It will be understood that in making up the shaped masses, castables or ramming mixes, water is added in the usual tempering amounts in preparing such mixes for use. Suitably, there is employed from about 2% to 8% of water as tempering liquid.

It is an advantage of the present invention that the bonding mixes exhibit excellent strength at cold and after heating to intermediate temperatures, while at the same time they exhibit excellent resistance to hydration, and satisfactory strengths at high temperatures. It is a particular advantage, therefore, that these mixes do not lump or set up upon storage, for example, in bags and during shipment. It is an unexpected advantage of the present invention that the bonding strengths are increased where both the alkali metal silicate described and the inorganic borate are employed in the admixture.

In order to illustrate more fully the method and composition of the present invention, the following examples are given.

EXAMPLE 1

A batch is prepared of periclase in graded coarse, intermediate, and fine particle sizes according to good practice in this art to give dense ultimate packing, and is divided into portions to provide mixes with various bonding agents. In Mix A there is incorporated with such periclase a bonding agent consisting of 2% sodium silicate of $Na_2O:SiO_2$ ratio 1:2 and having 17% water of hydration, and 1% anhydrous borax. For Mix B there is admixed with another portion of this periclase 2% of the same type of sodium silicate, and 1% boric acid. A third batch, C, is made up of another portion of the same periclase, 2% of the same kind of Na silicate and 1% colemanite, $Ca_2B_6O_{11}\cdot5H_2O$. Each batch is mixed with a tempering amount of water (3.5%, based on total dryweight) and pressed into pellets 2¼" in diameter and 2" in height, using 9,000 p.s.i. forming pressure. Some of the pellets of each mix are dried at 150° C., then crushed to determine crushing strengths and other pellets are heated to 850° C., cooled and then crushed, with the following results:

*Table I*

| Mix | Crushing Strengths in p.s.i. after heating at— | |
|---|---|---|
| | 150° | 850° |
| A | 7,570 | 7,165 |
| B | 1,170 | 2,990 |
| C | 7,690 | 5,890 |

The periclase used has the following typical analysis: Ignition loss 0.16%, 5.51% $SiO_2$, 0.42% $Fe_2O_3$, 0.14% $Al_2O_3$, 0.92% CaO, 92.85% MgO (by difference).

It can be seen that Mix B containing the silicate and boric acid has very inferior strengths. Where the borates are substituted for boric acid, with this silicate, the cold strengths are increased almost 7-fold and the strength after firing to intermediate temperature (850° C.) is twice as high in Mix C, and almost 2½ times as high where sodium tetraborate is used, as compared with Mix B. The hydration resistance of all three mixes is good, but the low strength of Mix B renders it unsatisfactory for installation in furnace linings, whereas Mixes A and C are of satisfactory strengths for such use.

In another series of tests using the same periclase and admixing 2% of the same kind of sodium silicate and no boron compound, the pellets exhibited excessive susceptibility to hydration under some conditions of use and caking upon storage and, while their original strengths after drying at 150° C. were satisfactory, their strengths after heating to 850° C. were about 20% lower than when anhydrous borax was incorporated as in A above. The addition of anhydrous borax prevented hydration and also increased the strengths, especially after firing to the intermediate temperature range.

EXAMPLE 2

A ramming is prepared of the following composition (Mix I.—Periclase):

|  | Percent by weight |
|---|---|
| Retained on 4 mesh | 0.19 |
| Passing 4 mesh and retain on 14 mesh | 43.96 |
| Passing 14 mesh and retained on 100 mesh | 16.70 |
| Passing 100 mesh | 26.15 |
| Fayalite (iron silicate) | 10.00 |
| Hydrated sodium silicate ($Na_2O:SiO_2$ ratio is 1:2), containing 18% water | 2.00 |
| Anhydrous borax, $Na_2B_4O_7$ | 1.00 |

The periclase has the following typical analysis: 5.8% $SiO_2$, 1.2% $R_2O_3$ (including 0.7% $Fe_2O_3$, and, by difference, 0.5% $Al_2O_3$), 1.0% CaO and 92.0% MgO (by difference). The fayalite and borax are each of at least 99% purity; and the fayalite, borax and silicate are each 90% minus 100 mesh.

The above Mix I is thoroughly blended together. One portion of this mix is thoroughly blended with 0.2% water, placed in a polyethylene bag, sealed and stored at 50–55° C. After 2 weeks, the material is in good condition with no evidence of lumping or setting. Other portions of this mix stored in the same manner, except that they were held at room temperature, were in satisfactory condition at the end of three months. Another mix, II, is made up of the same periclase and fayalite, but with the addition only of 2% hydrated sodium silicate ($Na_2O:S_1O_2$ ratio 1:2). Part of Mix II is held at 50–55° C. and part at room temperature, in the same manner of storage as for Mix I, and both portions are found to lump very badly, and such a mix would be unsuitable for use.

EXAMPLE 3

A further amount of Mix I of Example 2 is formed into pellets 2¼ inches in diameter and 2 inches high, under a forming pressure of 4,000 p.s.i. Another Mix III is made up of the same periclase and fayalite but instead of 2% of the sodium silicate and 1% of the sodium borate used in Mix I, Mix III contains 0.5% boric acid and 1.5% sodium silicate of ratio $Na_2O:SiO_2$ equal to 1:3.22; and Mix III is formed into pellets in the same way. A further portion of Mix II of Example 2 is also formed into pellets in the same manner. Another mix, IV, is made up of the same periclase and fayalite as Mix I, but instead of the anhydrous borax and sodium silicate, there is incorporated herein 1.5% ortho-boric acid, and this mix is formed into pellets in the same way.

The various batches of pellets are divided into portions and 1 portion of each is heated at 150° C. to dry and a second portion of each is heated at 850° C. The heated portions are cooled to room temperature and crushing strengths determined, with the results shown in Table I.

*Table II*

| Mix | Crushing Strengths in p.s.i. after heating to— | |
|---|---|---|
|  | 150° C. | 850° C. |
| I | 8,375 | 11,480 |
| II | 4,300 | 4,500 |
| III | 850 | 1,850 |
| IV | 2,350 | 2,900 |

It can be seen that Mix II, which was made according to the best prior art practice, and consisted essentially of periclase, fayalite and sodium silicate, the latter being incorporated as a cold bonding agent, has adequate, though not excellent, strength. It has been found in practice to have the disadvantage, however, of being susceptible to the hydration tendencies more fully explained hereinabove. Mix IV, containing boric acid but no sodium silicate exhibits lower strength and where sodium silicate and boric acid are both incorporated, (Mix III) the strengths after heating both to drying and to intermediate temperatures, are very inferior. In Mix I, wherein the highly soluble sodium silicate and anhydrous borax are incorporated, the strengths are excellent, and it has been found that hydration resistance of Mix I is also excellent.

In addition to the advantageous results of the present invention with respect to strengths, hydration resistance and storage characteristics, bricks or linings made of basic aggregate and the bonding material according to the present invention have shown uniform bonding from the hot face to the cold face when tested after firing to working temperatures, e.g., 1,650° C.

In preparing gunning mixes according to this invention, for use in repairing the linings in high temperature metallurgical furnaces, it is especially useful to employ with a major portion of nonacid, or of basic, grain material, a minor portion of a bonding mix consisting essentially of from 90% to 95% finely divided, deadburned magnesia, from 2.0% to 4.0% of a water-soluble, inorganic salt of boric acid, calculated as $B_2O_3$, preferably anhydrous borax, and from 4% to 8% of a hydrated sodium silicate having a $Na_2O:SiO_2$ ratio of substantially 1:2. Such sodium silicate is very or highly soluble in water, and upon mixing with the necessary water, provides with the remaining bonding components and the necessary usual basic grain material a very advantageous gunning mix in that the material can be stored, and shipped without setting up or lumping and the mix is tacky at low furnace temperatures and readily adheres to the furnace wall. If desired, from 15% to 35% of the MgO can be substituted by fayalite or another ceramic bond-forming substance. The bonding materials and the refractory batches, which include the same, according to the present invention are useful as ramming mixes, hot or cold patching mixes, gun mixes, spray mixes or for making formed shapes, and are useful in high temperature metallurgical furnaces or other installations, for example, in repairing open hearths and electric steel furnace bottoms, in making tapholes for steel furnaces, and for lining ferro-alloy holding ladles, for burner ports in non-metallurgical furnaces.

Amounts and percentages referred to in the specification and claims are by weight unless otherwise indicated. Mesh sizes referred to herein are Tyler standard sieve sizes, which are defined in Chemical Engineers' Handbook, John H. Perry, editor-in-chief, second edition, 1941, published by McGraw-Hill Book Company, at page 1719. In conformity with common practice in reporting chemical analyses of refractory materials, the proportions of various chemical constituents present in a material are given as though these constituents were present as the simple oxides. Thus, the magnesium constituent is reported as magnesia, MgO, the silicon constituent as silica, $SiO_2$, and so forth, although some magnesia and the silica may be present as magnesium silicate, for example. It will be understood that the above specific description and examples have been given for purposes of illustration only and that various modifications can be made therein without departing from the spirit and scope of the appended claims. The amounts added, e.g., of boron oxide, are in addition to any amounts which may be inherently present as impurities in the starting materials such as magnesia. The borates employed are at least slightly soluble in water. It is to be understood that other ceramic bond-forming materials can also be incorporated in the mixes according to this invention, if desired. The boric acid salt employed is preferably a salt of an alkali metal, especially sodium or potassium, or of an alkaline earth metal, especially calcium or magnesium with one of the boric acids disclosed hereinabove. Mixtures of such boron components or double borates of such metals can be used if desired.

Having now described the invention, what is claimed is:

1. An unfired refractory composition consisting essentially of a major portion of non-acid refractory grain and a minor portion of bonding material consisting essentially of finely divided magnesia, from 2% to 12% by weight of the bonding material of alkali metal silicate and from 0.5% to 6% by weight of the bonding material, calculated as $B_2O_3$, of a water-soluble alkali metal salt of boric acid, said silicate being readily soluble in water and having an alkali metal oxide to silica ratio of from 1:1.5 to 1:3.

2. A refractory bonding material consisting essentially of finely divided magnesia, from 2% to 12% by weight of alkali metal silicate, and from 0.5% to 6% by weight, calculated as $B_2O_3$, of a water-soluble alkali metal salt of boric acid, said silicate being readily soluble in water and having an alkali metal oxide to silica ratio of from 1:1.5 to 1:3.

3. A refractory bonding material according to claim 2 wherein said alkali metal silicate is sodium silicate.

4. A refractory bonding material according to claim 3 containing from 4% to 8% of said sodium silicate.

5. A refractory bonding material according to claim 2 containing from 2.0% to 4.0% of said salt of boric acid.

6. A refractory bonding material according to claim 2, wherein said silicate is hydrated sodium silicate having a sodium oxide to silica ratio of 1:2.

7. A refractory bonding material according to claim 6 wherein said silicate contains from 17% to 20% water of hydration.

8. A refractory bonding material consisting essentially of from 2% to 12% by weight of alkali metal silicate and from 0.5% to 6% by weight, calculated as $B_2O_3$, of a water-soluble alkali metal salt of boric acid, the remainder being iron silicate and finely divided magnesia, said magnesia being present in at least sufficient amount to react with all of said iron silicate upon firing to form magnesium ferrite and magnesium orthosilicate, said alkali metal silicate being readily soluble in water and having an alkali metal oxide to silica ratio of from 1:1.5 to 1:3.

9. A refractory bonding material according to claim 8 wherein said silicate is sodium silicate.

10. A refractory bonding material as in claim 8 wherein said silicate is hydrated sodium silicate having a sodium oxide to silica ratio of 1:2 and is present in an amount of from 4% to 8%.

11. A refractory bonding material according to claim 8 wherein said salt of boric acid is present in an amount of from 2.0% to 4.0%.

12. A refractory bonding material according to claim 11 wherein said salt is anhydrous borax.

13. An unfired refractory composition consisting essentially of a major portion of basic refractory grain and a minor portion of bonding material consisting essentially of from 2% to 12% by weight of the bonding material of readily water-soluble sodium silicate having a sodium oxide to silica ratio of from 1:1.5 to 1:3 and from 0.5% to 6% by weight of the bonding material, expressed as $B_2O_3$, of a water-soluble alkali metal salt of boric acid, the remainder of the bonding material being iron silicate and finely divided magnesia, said magnesia being present in at least an amount to react with all of said iron silicate upon firing to form magnesium ferrite and magnesium orthosilicate.

14. A basic refractory gunning mix consisting essentially of a major portion of basic refractory grain and a minor portion of a bonding material consisting essentially of from 2% to 12% by weight of the bonding material of readily water-soluble sodium silicate having a sodium oxide to silica ratio of 1:2 and from 2.0% to 4.0% by weight of the bonding material, calculated as $B_2O_3$, of an alkali metal salt of boric acid, the remainder of the bonding material being iron silicate and finely divided magnesia, said magnesia being present in at least an amount to react with all of said iron silicate upon firing to form magnesium ferrite and magnesium orthosilicate.

15. A basic refractory gunning mix consisting essentially of a major portion of basic refractory grain and a minor portion of a bonding material consisting essentially of from 15% to 35% finely divided fayalite, from 2.0% to 4.0%, calculated as $B_2O_3$, of a water-soluble alkali metal salt of boric acid, and from 4% to 8% of hydrated sodium silicate having a sodium oxide to silica ratio of 1:2, the remainder of said bonding material being finely divided magnesia.

16. A gunning mix according to claim 15 wherein said salt of boric acid is anhydrous borax.

References Cited by the Examiner

UNITED STATES PATENTS

| 2,433,415 | 12/1947 | Austin | 106—60 |
| 2,952,553 | 9/1960 | Ilenda et al. | 106—84 |
| 2,999,759 | 9/1961 | Heuer | 106—60 |

FOREIGN PATENTS

| 582,595 | 9/1959 | Canada. | |

TOBIAS E. LEVOW, *Primary Examiner.*

JOSEPH REBOLD, *Examiner.*

J. E. POER, *Assistant Examiner.*